Dec. 22, 1942.   W. TIMSON   2,306,197
AUTOMATIC WEIGHING AND INDICATING MECHANISM
Filed Jan. 25, 1940   2 Sheets-Sheet 1

William Timson
Inventor
by Marshall & Marshall
Attorneys

Dec. 22, 1942.    W. TIMSON    2,306,197
AUTOMATIC WEIGHING AND INDICATING MECHANISM
Filed Jan. 25, 1940    2 Sheets-Sheet 2
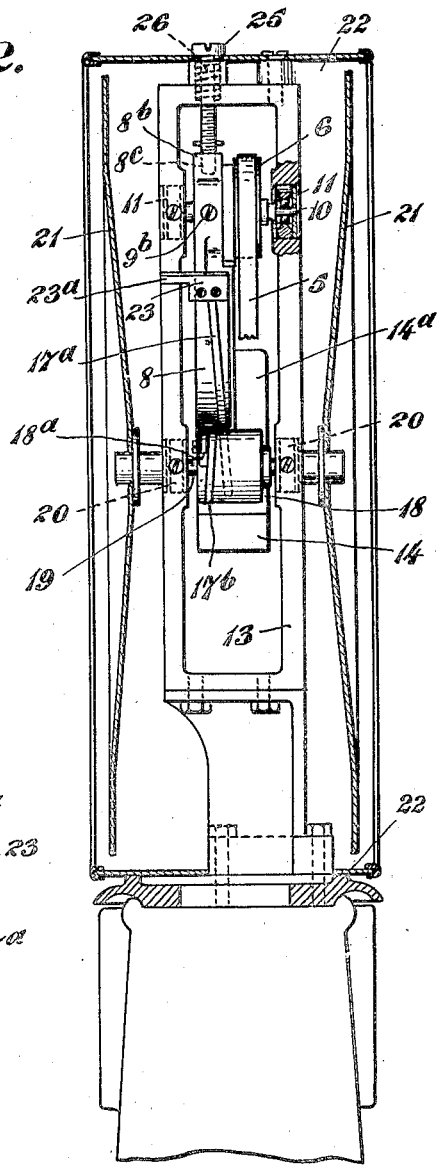
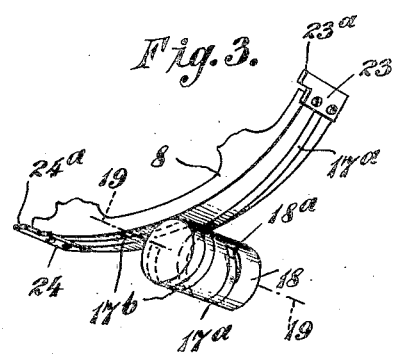
William Timson
Inventor
by Marshall & Marshall
Attorneys Patented Dec. 22, 1942

2,306,197

UNITED STATES PATENT OFFICE 2,306,197

AUTOMATIC WEIGHING AND INDICATING MECHANISM

William Timson, Birmingham, England, assignor to W. & T. Avery Limited, Birmingham, England Application January 25, 1940, Serial No. 315,554
In Great Britain February 2, 1939

1 Claim. (Cl. 265—62)

This invention has reference to improvements in automatic weighing and indicating mechanism, and has for its object to improve and simplify the method of mounting a pendulous weight resistant unit and an associated rotatable indicating unit, and further, to improve the means of connection between the two units which partake of the form of flexible metallic ribbons, the said mechanism being of a robust but sensitive character.

The invention consists of improvements in automatic weighing and indicating mechanism, characterised by a pendulus weight resistant unit rotatably mounted in a ball bearing support and a rotatable indicating unit mounted in another ball bearing support, the said ball bearing mountings being vertically disposed in relation one to the other, and a plurality of flexible metallic ribbons constituting the connection between the said units whereby a rotation of the one unit is positively communicated to the other unit.

A convenient embodiment of the invention will now be described with particular reference to the accompanying sheet of drawings, wherein:

Figure 2 is a part sectional end elevation of the automatic weighing and indicating mechanism and of the portion of the weighing scale illustrated in Figure 1, and Figure 3 is a fragmentary view in perspective showing in greater detail the arrangement of the flexible metallic ribbons for imparting rotation to the indicating mechanism.

Figure 1:
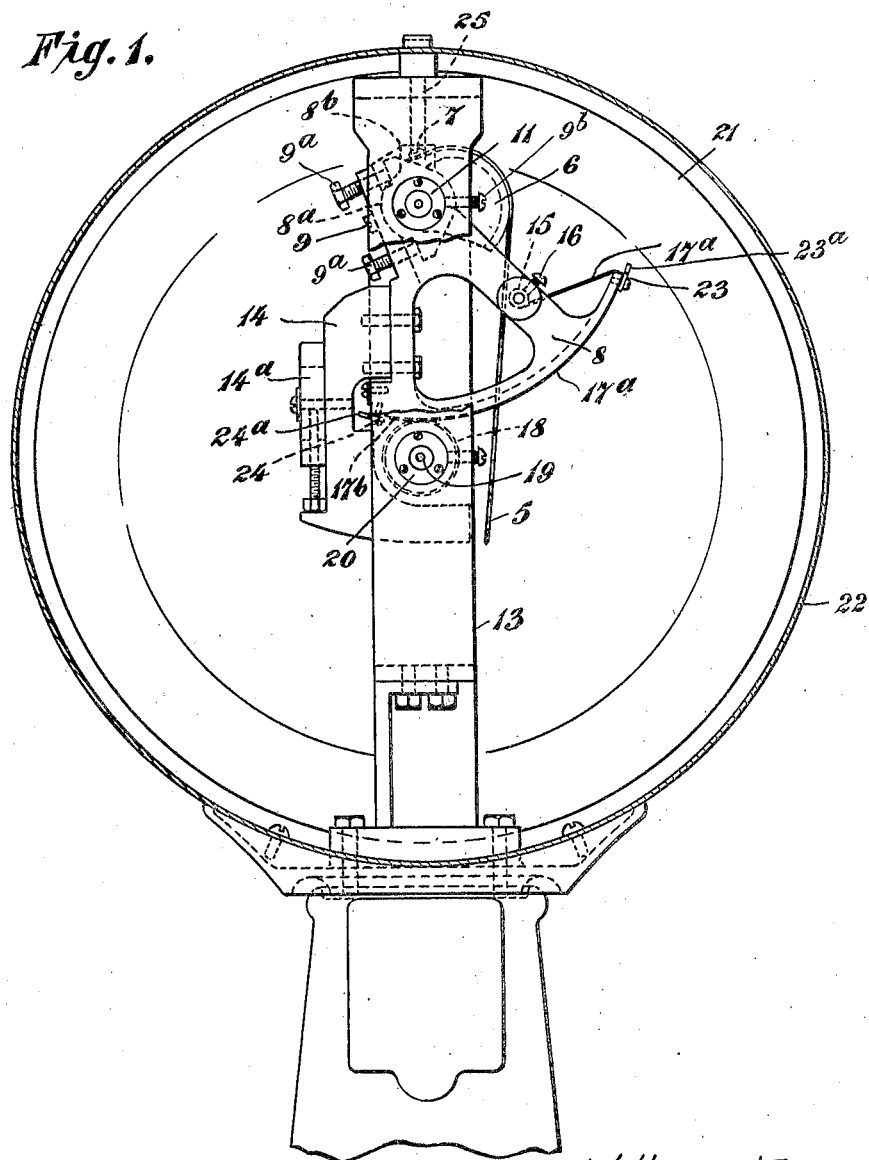
Figure 1 is a front elevation partly in section of the improved automatic weighing and indicating mechanism as embodied in a weighing scale of known kind and sufficient only of which is shown as is necessary to an understanding of the invention.

According to the embodiment of the invention illustrated the pull of the load is transmitted to the lower end of a flexible metallic ribbon 5 the upper portion of which passes over the curved surface of a cam sector 6 and is clamped adjacent its upper end to the cam sector 6 by a clamping plate 7 associated with the said cam sector. The cam sector 6 is mounted on an extension of the hub 8a of a resistant sector 8 and is locked thereon by means of a set screw 9, a pair of oppositely arranged set pins 9a being utilised for permitting of the adjustment of the cam sector 6 relatively to the resistant sector 8. The hub 8a of the resistant sector 8 is fixed by means of a set pin 9b on a spindle 10 which is rotatably mounted in ball bearing mountings 11 which are secured within the side walls of a frame 13. A mass 14 incorporating a vertically displaceable counterbalancing mass 14a is secured to one end of the resistant sector 8 said masses 14 and 14a in conjunction with the resistant sector 8 constituting the pendulous resistant unit.

At one end hereafter termed the upper end, the resistant sector 8 carries a laterally projecting screw peg 15 which is locked in a set position by a screw pin 16 said peg 15 having anchored thereto one end of a flexible ribbon 17a the intermediate portion of which is first drawn obliquely over the curved undersurface of the resistant sector 8 and then wound spirally around the periphery of a drum 18 the free end of the ribbon being anchored within a slotted portion 18a of the drum 18. The other end of the cam sector 8 hereafter termed the lower end has clamped thereto one end of a complementary flexible ribbon 17b which also is first drawn obliquely over the curved undersurface of the resistant sector 8 and then wound spirally but in an opposite direction around the periphery of the drum 18 said ribbon 17b being anchored in a slotted portion 18a of the drum 18 in a manner similar to the complementary flexible ribbon 17a.

The drum 18 is secured to a spindle 19 henceforth termed the indicating spindle 19 which is mounted in ball bearing mountings 20 which are similar to the ball bearing mountings 11 and which are located vertically below the said ball bearing mountings 11. The indicating spindle 19 has projecting ends on which are fixed graduated charts 21 which in conjunction with relatively fixed indices not shown permit of the observation of the weight from each side of the scale housing 22 within which the mechanism described is contained said drum 18, spindle 19 and charts 21 constituting the rotatable indicating unit.

The flexible metallic ribbon 17a is associated with a clamping plate 23 and the flexible metallic ribbon 17b with a clamping plate 24, the clamping plate 23 incorporating an extension 23a which serves to limit the swing of the resistant sector 8 in one direction while the clamping plate 24 incorporates an extension 24a which limits the swing of the resistant sector 8 in the opposite direction.

Since the complementary metallic ribbons 17a, 17b are wound around the drum 18 in opposite directions upon a pull being imparted to the ribbon 5 the cam sector 6 and the resistant sector 8 are rocked and caused to impart a corresponding rotation to the drum 18 and consequently also to the graduated charts 21.

The hub of the resistant sector 8 is provided with a boss 8ᵇ having therein a tapped hole 8ᶜ which can be engaged with the shank of a screw bolt 25 displaceably mounted in the upper end of the frame 13. Normally the screw 25 is maintained out of engagement with the hole 8ᶜ by a spring 26 but when it is desired to lock the unit the said screw 25 is pressed downwardly, with the indicating mechanism in the zero position, and the shank of the said screw engaged in the hole 8ᶜ in the boss thus locking the sectors 6 and 8 to the frame 13.

The peg 15 permits of the adjustment of the tension of the flexible ribbon 17ᵃ much in the manner of a violin tuning peg.

It will be appreciated that the whole of this weight resistant unit and rotatable indicating unit is mounted in a common framework, and that the usual rack and pinion or like means for transmitting the motion from the resistant unit to the indicating unit is avoided, and that the use of any knife-edge or cone bearing support is also avoided.

The method of spirally winding and connecting the oppositely wound flexible metallic ribbons to the rotatable drum indicating unit admits of a complete rotation of the indicator over 360° or more should such a large degree of rotation of the indicator be found to be desirable.

What I claim is:

Automatic weighing mechanism comprising, in combination, a frame carrying two sets of ball bearings, a sector pivoted in one of said sets of ball bearings, which is movable in response to the weight of the load, a screw in said frame, extending toward said sector in an approximately radial direction and registering at one position of said sector with a tapped hole therein a spring for holding said screw normally out of engagement with said sector, an indicator shaft journaled in said other set of ball bearings, a drum on said shaft, ribbons having a portion fixed to said drum, which are wound in a spiral groove on said drum and extend obliquely along the arcuate face of said sector in opposite directions from said drum, and means for securing the remote ends of said ribbons to said sector.

WILLIAM TIMSON.